United States Patent [19]

Grohoski

[11] 4,107,400
[45] Aug. 15, 1978

[54] BATTERY HATCH COVER

[75] Inventor: Raymond J. Grohoski, Watertown, Conn.

[73] Assignee: Timex Corporation, Waterbury, Conn.

[21] Appl. No.: 809,575

[22] Filed: Jun. 24, 1977

[51] Int. Cl.² .............................................. H01M 2/10
[52] U.S. Cl. ...................................... 429/98; 429/100; 58/23 BA
[58] Field of Search ....................... 429/96, 97, 98, 99, 429/100; 58/23 BA

[56] References Cited

U.S. PATENT DOCUMENTS 3,695,938  10/1972  Brodie .................................. 429/98
3,945,193  3/1976  Yasuda et al. ........................ 429/98

FOREIGN PATENT DOCUMENTS 374,938  3/1964  Switzerland .......................... 58/23 BA Primary Examiner—Donald L. Walton
Attorney, Agent, or Firm—William C. Crutcher

[57] ABSTRACT

A button-type energy cell or battery for operating an electronic or electric wristwatch is retained inside an opening in the case by a hatch cover adhered to the case by a non-permanent adhesive connection. The hatch cover also has means to temporarily grip the battery for removal along with the hatch cover. In one case the gripping means is adhesive on the hatch cover, and in a second embodiment, the gripping means comprises spring fingers on the hatch cover.

5 Claims, 2 Drawing Figures

BATTERY HATCH COVER

BACKGROUND OF THE INVENTION

This invention relates generally to an improvement in a hatch cover for a miniature electrical device operated by a battery or button-type energy cell. More particularly, the invention relates to an improvement wherein such batteries are easily removable and replaceable without need for special tools or skill.

The miniaturization of electrical and electronic devices has been accompanied by the increased use of small batteries or button-type energy cells. For example, in electric or electronic watches, such batteries are usually held in place by a screw-thread hatch cover as exemplified in U.S. Pat. No. 3,916,613 issued Nov. 4, 1975 to Esselborn and assigned to the present assignee. Another type of hatch cover employs an interference fit and is pried off with a sharp instrument. This is a well known construction used by applicant's assignee and others. Batteries are also held in cavities or openings in structures contiguous to miniature electrical devices with connections for electrically connecting the device to the battery, as exemplified in U.S. Pat. No. 3,729,923 issued May 1, 1973 to Brigliano et al.

With the proliferation of miniature electrical and electronic devices in the consumer area, it has become increasingly important to facilitate replacement of batteries without the need for special skill or instruments. Most of the known hatch covers make direct electrical contact between the back of the button cell and the hatch cover and make contact on the other end between a projection on the cell and the contact spring. In this manner the case is used as the ground and must be conductive.

In some applications, the case may be of non-conductive material such as plastic or, as indicated in the aforementioned Brigliano et al. patent, the enclosure containing the battery may be of insulating material, requiring two spring contacts for making electrical connections.

In either event, close fits and small battery size often make removal of the battery difficult for the average consumer. In some cases, inappropriate instruments will be used for removal of the energy cell causing damage to the electrical device.

Accordingly, one object of the present invention is to provide an improved battery hatch cover which facilitates removal and replacement of the battery.

Another object of the invention is to provide an improved battery hatch cover which permits non-conductive cases or enclosures for the battery of a small electrical or electronic device.

DRAWING

The invention both as to organization and method of practice, together with further objects and advantages thereof, will best be understood by reference to the following description, taken in connection with the accompanying drawing, in which:

FIG. 1 is an enlarged elevation view, partly in cross section, of a battery hatch cover according to the preferred embodiment of the invention, and, FIG. 2 is a similar view of a battery hatch cover according to a second embodiment of the invention.

SUMMARY OF THE INVENTION

Briefly stated, the invention comprises an improvement in a battery enclosure having an opening in its wall for inserting a battery to make contact with a pair of spring contacts therein connected to an electrically actuated device. The improvement comprises a hatch cover for the battery opening with peripheral edges overlapping the enclosure wall, and adhesive between the hatch cover edge and the enclosure wall portions for both sealing and temporarily adhering the hatch cover to the enclosure, and means on the hatch cover for temporarily gripping at least one battery to facilitate removal of the battery from the enclosure when the hatch cover is removed.

DESCRIPTION OF THE PREFERRED EMBODIMENT

Figure 1:
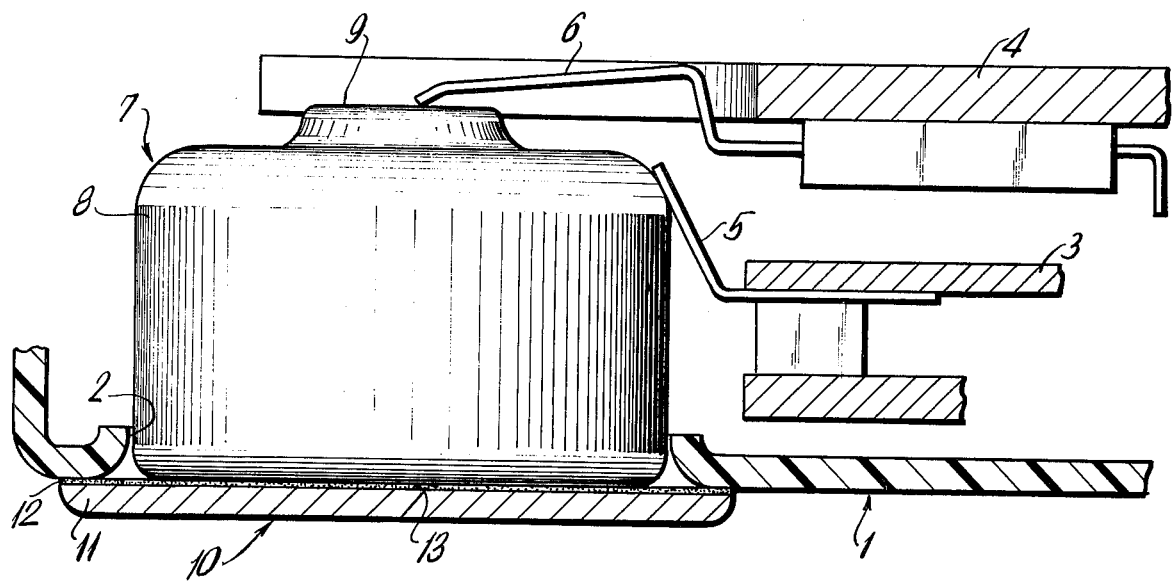

Referring now to FIG. 1 of the drawing, portions of an enclosure wall, in this case a watch case, are indicated by reference numeral 1 which define a circular battery opening 2. Inside the enclosure is an electrical device, the nature of which is not material to the present invention, but which may comprise an electric watch movement as exemplified in assignee's U.S. Pat. No. 3,699,762 issued to Zatsky on Oct. 24, 1972, or a solid state electronic watch module as exemplified in assignee's U.S. Pat. No. 3,863,463 issued to Schwarzchild et al. on Feb. 4, 1975. This electrical device is represented by the movement and frame members 3,4 respectively having spring contacts 5,6 respectively connected to the electrically actuated device inside enclosure 1. The wall of enclosure 1 may be either of insulating plastic material as shown, or may be metal.

Disposed inside enclosure 1 is a button-type energy cell 7, the construction of which is well known in the art, having an electrically conductive outer case 8 and a projecting terminal 9 of opposite polarity. The case 8 makes electrical contact with the spring contact number 5 and the terminal 9 makes contact with the spring contact arm 6.

In accordance with the present invention, a battery hatch cover 10, has peripheral edge portions 11 which overlap the portions of the enclosure wall defining opening 2. A layer of tacky adhesive is coated on one side of the hatch cover 10. This adhesive is both located at the peripheral edges of the hatch cover as shown at 12 between the overlapped walls so as to provide a temporary seal, and is also disposed in the central portion of the hatch cover at 13, so as to provide a means on the hatch cover for temporarily gripping the back side of the battery 7. A suitable adhesive for this purpose is a type used on commercially available masking tapes and the like which is tacky and does not form a permanent bond, but which seals the interior of the enclosures 1 from moisture or dust. A suitable adhesive is one of the type used on double coated film tape No. 15, sold by Minnesota Mining and Manufacturing Co., U.S.A.

MODIFICATION

Figure 2:
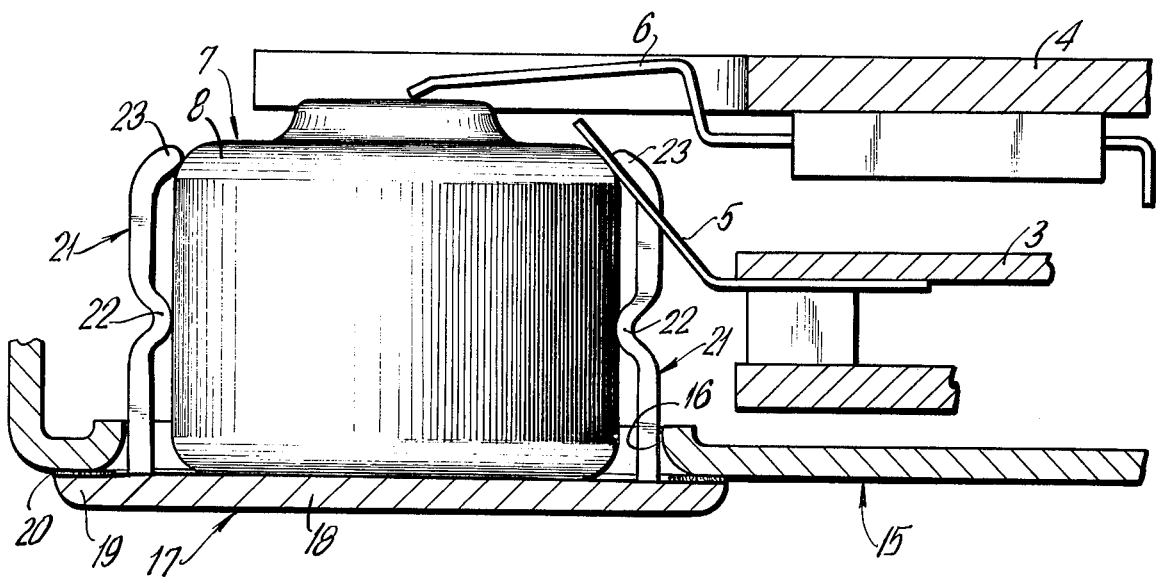

Referring now to FIG. 2 of the drawing, a modified form of the invention is illustrated.

The enclosure in FIG. 2 is partially indicated by wall portion 15, which may be either conductive or insulating and defining an opening 16, of any desired shape. The internal electrical device, spring contacts, and battery are represented by the same reference numerals as shown in FIG. 1.

In the modified form of the invention, the battery hatch cover shown as 17 comprises a flat cover portion 18, again having overlapping peripheral edge portions 19. An adhesive, similiar to the one described in connection with FIG. 1 is disposed at reference numeral 20 on the peripheral edge portions between the overlapping walls, which may be noncircular.

Extending from the cover portion of the hatch cover are several spring contact fingers 21, preferably three or four in number. These have protrusions 22,23 designed to temporarily grip the battery 7 in the hatch cover. If desired, the spring fingers can be electrically conductive and serve as intermediate conductors, making electrical contact on their opposite sides with the spring contact 5.

OPERATION AND ADVANTAGES

Operation of the embodiments of FIGS. 1 and 2 are as follows. In FIG. 1, the battery is positioned on the hatch cover and the hatch cover pressed into place, causing the battery to make electrical contact with the members 5,6. When it is desired to replace the battery, the cover is removed by breaking the tacky adhesive seal. The battery, together with the hatch cover is removed as a single assembly, because of the adhesive 13 temporarily gripping the battery. Since the electrical contacts are made against the battery side wall and inner terminal, it is not necessary to provide grounding through the rear of the battery. Consequently the invention facilitates the use of plastic enclosures.

The operation of FIG. 2 of the drawing is as previously described except that the battery is inserted in the spring clips 21 before pressing the battery assembly into place and adhering it to the enclosure wall. The embodiment of FIG. 2 facilitates use of one or more batteries of varying dimensions or undersize batteries, and also permits irregular or noncircular shapes in the enclosure opening without need for close dimensional control.

While there has been described what is considered to be the preferred embodiment of the invention and one modification thereof, other modifications will occur to those skilled in the art, and it is desired to include in the appended claims all such modifications as fall within the true spirit and scope of the invention.

I claim:

1. In a battery enclosure containing a battery and having a wall defining an opening therein for inserting at least one battery and having a pair of spring contacts therein connected to an electrically actuated device, the improvement comprising;
    a hatch cover having a central portion for covering said opening and having peripheral edges overlapping portions of said enclosure wall,
    a tacky adhesive disposed between the hatch cover peripheral edges and the overlapped enclosure wall portions, and
    means on the hatch cover temporarily gripping said battery to facilitate removal of the battery from the enclosure when the hatch cover is removed.

2. The combination according to claim 1 wherein said temporary gripping means comprises additional tacky adhesive disposed between the battery and the central portion of the hatch cover.

3. The combination according to claim 1, wherein said gripping means comprises a plurality of spring fingers extending from the hatch cover and clasping the battery to temporarily hold it.

4. The combination according to claim 1, wherein said battery is insulated from the enclosure wall by means of said tacky adhesive.

5. The combination according to claim 1, wherein said battery makes electrical contact by spring pressure against said pair of electrical contacts inside the enclosure and wherein said enclosure walls are made of insulating material.

* * * * *